Patented Oct. 27, 1931

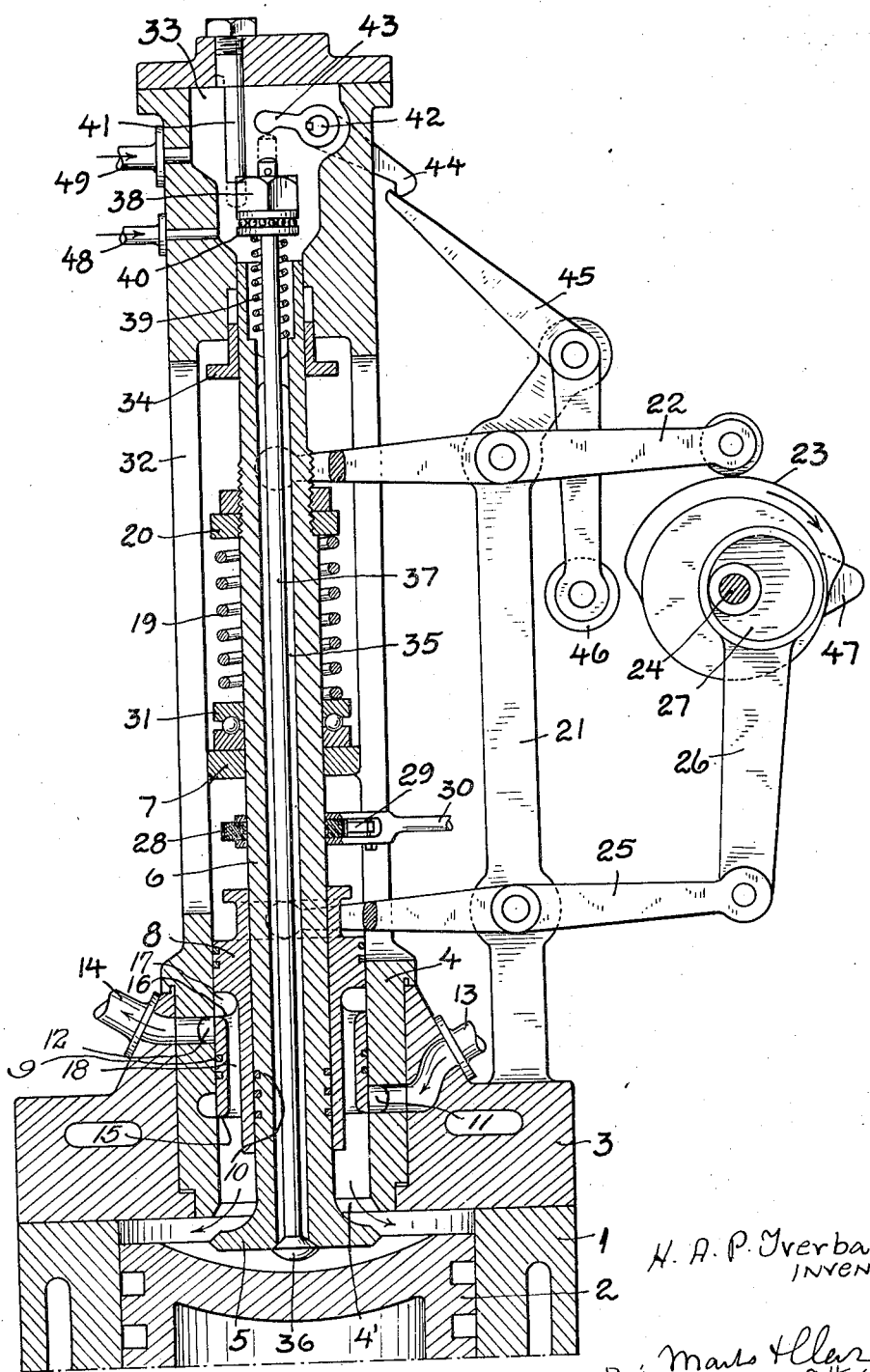

1,828,792

UNITED STATES PATENT OFFICE

HÅKON AKSEL PEDERSEN TVERBAKK, OF KJERRINGOY IN SALTEN, NORWAY

VALVE FOR INTERNAL COMBUSTION ENGINES AND THE LIKE

Application filed April 23, 1930, Serial No. 446,708, and in Norway August 22, 1927.

The present invention relates to internal combustion engines, in which the usual poppet valve is combined with a reciprocating valve and a fuel admission valve controlling both the admission and the exhaust said valves being actuated from a single cam shaft.

In accordance with the invention the reciprocating valve is positively controlled in both of its directions of movement by means of an eccentric mechanism actuated from a cam shaft which, in a manner known per se, by means of a cam or cams and a lever or levers, at the same time opens the poppet valve against the action of a spring which tends to close said poppet valve.

A further feature of the invention consists therein, that in the poppet valve is embodied a fuel admission valve, which is also controlled from the same cam shaft as the poppet valve and the reciprocating valve.

The invention is illustrated by way of example on the annexed drawing in which is illustrated the top portion of an engine cylinder and the valve arrangement, partly in axial section.

Reference numeral 1 denotes the cylinder of an internal combustion engine, 2 the piston and 3 the cylinder cover or head. In said cover is arranged a sleeve 4 the lower end of which is shaped to form a seat 4' for a poppet valve 5, the stem 6 of which is guided in a cross piece 7 arranged in the upward extensions 32 of the sleeve 4.

On the stem 6 and snugly fitting within the sleeve member 4 is a reciprocating valve 8 which by means of packing rings 9 fits tightly against the inner cylindrical surface of the sleeve member 4, and against the stem 6 by means of other packing rings 10 arranged on said stem.

The sleeve 4 is on its inner cylindrical surface provided with two annular grooves 11 and 12, one above the other and communicating with tubes 13 and 14 respectively. The groove 11 is controlled by the lower edge 15 of the reciprocating valve 8, and the groove 12 is controlled by the lower edge 16 of an annular groove 17 in the valve 8, which groove 17 through channels 18 communicates with the inner space of the sleeve 4 which is situated between the valve 8 and the valve 5.

The valve 5 is normally kept closed by means of a spring 19 situated between the cross portion 7 and a flange or collar 20 on the stem 6. To the cylinder head or cover 3 is secured a vertical upright arm 21, at the upper end of which is pivoted a lever 22, one end of which is under control of a cam 23 secured to a cam shaft 24 whereas the other end of said lever acts upon the valve stem 6.

To the arm 21 is also pivotally secured a lever 25 one end of which is connected with the slidable valve 8 and the other end of which is connected with a pitman 26 actuated by an eccentric disc 27 on the cam shaft 24.

As will be understood that the inlet groove 11 and the outlet groove 12 may be interchanged so that the exhaust takes place through the lower groove 11.

The valve 5 serving to control both inlet and exhaust may readily be covered with dirt or combustion residues from the exhaust gases. In order to avoid this the valve is rotatable by means of a pawl 29 and ratchet 28 which is periodically moved by one of the moving parts of the engine. Such periodical movement may be caused to take place at any suitable time of the engine cycle, when for instance the valve is in closed position or just at the moment it opens or closes. In order that the resistance of the valve 5 against rotation shall be the least possible a ball bearing 31 may be arranged between the spring 19 and the cross piece 7.

The sleeve member 4 has vertical extensions 32 connecting the same with a top portion having therein a chamber 33 into which the stem 6 of the valve 5 extends through a suitable packing box 34. The stem 6 is provided with a longitudinal bore 35 the lower end of which is normally closed by a valve head 36 having a valve stem 37 of smaller diameter than the diameter of said bore 35 and extending up into the chamber 33. At its upper end the stem 37 carries a nut 38 and between said nut and an internal shoulder on the stem 6 is arranged a spring 39 which keeps the valve head 36 normally in closed position.

Between the spring 39 and the nut 38 may be interposed a ball bearing 40 in order that the spring may be rotatable in relation to the nut. To the cover of the chamber 33 is secured a pin 41 which extends down into a slot in the nut 38 and prevents the latter and thereby the valve 36 from rotating together with the valve 5, but permits longitudinal movement of the valve 36.

Through the wall of the chamber 33 passes a rotatable shaft or pin 42 the inner end of which carries keyed thereto an arm 43 which when swung downwardly serves to open the valve 36. To that end of the shaft 42 which extends outside of the chamber is secured an arm 44, which may be actuated by one end of a lever 45 pivotally mounted on the upright 21, the other end of said lever carrying a roller which cooperates with a cam 47 secured to the shaft 24.

In operation by the rotation of the shaft 24 the eccentric disc 27 will raise the valve 8 through the arm 26 and lever 25 so that the edge 15 uncovers the groove 11, and air will then be drawn into the cylinder from the conduit 13. When the piston has reached its lowermost position and the compression stroke begins, valve 5 is closed and at the same time valve 8 is lowered to its middle position, shown in the drawing.

Fuel under pressure is admitted to the chamber 33 through a conduit 48 and passes down to the valve head 36 through the space around stem 37 in the bore 35. At the end of the compression stroke the cam 47 acts upon the lever 45 which through the arms 44 and 43 opens the valve 36 and the fuel is forced into the cylinder.

If the air admitted through the tube 13 is used for scavenging purposes, extra air for the combustion must be introduced, such extra air may be admitted through a tube 49 which communicates with the chamber 33, whereby a combustion mixture of fuel and air will be fed into the engine cylinder.

When the compression and combustion strokes have taken place the valve 5 is again opened, but in the meantime the sliding valve 8 has moved so much downwardly that the edge 16 has opened the groove 12, whereby the exhaust may escape through the opening of the valve 5, the channels 18, the grooves 17 and 12 and the tube 14. At the end of the exhaust stroke the valve members have again reached their positions shown in the drawing and the operation described above is repeated.

Having now particularly described and ascertained the nature of my said invention and in what manner the same is to be performed I declare that what I claim is:

1. In a valve arrangement for internal combustion engines, the combination of a cylinder cover, a sleeve arranged in said cover having inlet and exhaust passages, the lower end of said sleeve forming a seat for a poppet valve, vertical extensions connecting the sleeve with a top portion containing a fuel chamber, into which the stem of the poppet valve extends, a packing box for said stem, a reciprocating valve adapted to control the exhaust fitting snugly in said sleeve, a fuel admission valve situated in a bore in the poppet valve and means for actuating all of said valves from a common cam shaft.

2. In a valve arrangement according to claim 1, a rotatable shaft passing through the wall of said fuel chamber, arms on the shaft, a cam controlled lever, said arms serving to cooperate with the lever and to actuate the fuel admission valve.

In testimony whereof I affix my signature.

HÅKON AKSEL PEDERSEN TVERBAKK.